(12) United States Patent
Sherwood

(10) Patent No.: US 7,526,510 B2
(45) Date of Patent: *Apr. 28, 2009

(54) SYSTEM AND METHOD FOR MAINTAINING A PERSONNEL DIRECTORY

(75) Inventor: Amy L. Sherwood, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 230 days.

This patent is subject to a terminal disclaimer.

(21) Appl. No.: 11/366,954

(22) Filed: Mar. 2, 2006

(65) Prior Publication Data

US 2006/0149773 A1 Jul. 6, 2006

Related U.S. Application Data

(63) Continuation of application No. 09/985,871, filed on Nov. 6, 2001, now Pat. No. 7,013,299.

(51) Int. Cl.
*G06F 17/30* (2006.01)
(52) U.S. Cl. .................. 707/200; 707/102; 707/10; 707/101
(58) Field of Classification Search .............. 707/100
See application file for complete search history.

(56) References Cited

U.S. PATENT DOCUMENTS

| | | | |
|---|---|---|---|
| 5,829,003 A | * | 10/1998 | Okura ................. 707/100 |
| 6,609,090 B1 | * | 8/2003 | Hickman et al. ......... 704/9 |
| 2002/0077998 A1 | * | 6/2002 | Andrews et al. ......... 707/1 |

* cited by examiner

*Primary Examiner*—Cam Y T Truong
(74) *Attorney, Agent, or Firm*—Withers & Keys, LLC

(57) ABSTRACT

A system and method for maintaining information in a personnel directory, according to which historical data is saved and associated with current data, so that a user can locate an individual using outdated information. An embodiment of the invention includes receiving a request to edit an existing data entry of the personnel directory, copying the existing data entry to create a previous data entry, editing the existing data entry, and associating the previous data entry with an associated data entry. A further embodiment includes receiving a search query looking for the previous data entry, searching the personnel directory for the previous data entry, identifying the associated data entry as corresponding to the previous data entry, and reporting the previous data entry and the associated data entry.

1 Claim, 7 Drawing Sheets

FIG. 1

[PRIOR ART]

SYSTEM AND METHOD FOR MAINTAINING A PERSONNEL DIRECTORY

RELATED APPLICATIONS

The present application is a continuation of U.S. application Ser. No. 09/985,871 filed on Nov. 6, 2001 now U.S. Pat. No. 7,013,299, and entitled Systems and Methods for Maintaining a Personnel Directory.

BACKGROUND

1. Field of the Invention

The subject matter disclosed herein relates generally to human resource management software, and more particularly, to a system and method for maintaining data in a personnel directory.

2. Background of the Invention

Large organizations, such as government agencies and major corporations, depend on electronic personnel directories to keep their members in contact with each other. Because these organizations frequently consist of multiple departments spread across wide geographic regions, members of these organizations cannot possibly be acquainted with all of the other members. Nonetheless, to accomplish certain tasks, members must be able to identify and contact other people within the organization. The personnel directory makes this exercise possible.

In a typical personnel directory, a user locates an entry by either browsing through an alphabetical list of names or by entering a name (or perhaps the first few letters of the name) in a search engine. Some personnel directories also enable a user to search using other criteria, such as telephone number, department, or organizational position. After locating the entry of a desired member of the organization, a user can retrieve contact information associated with the member, such as telephone number, e-mail address, room number, organizational position, and home address. With this contact information, the user can then reach the desired person.

Figure 1:
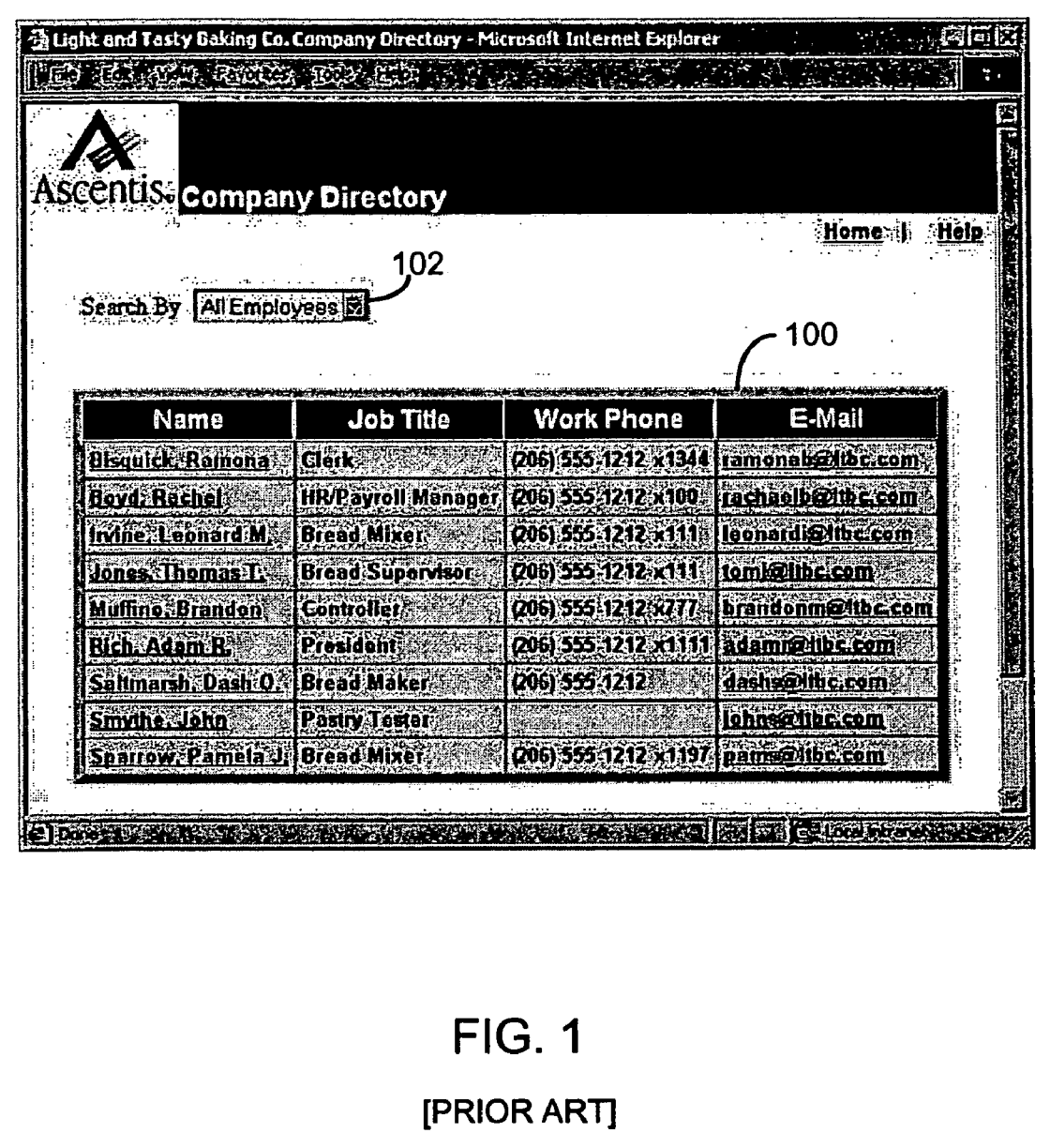

FIGS. 1 and 2 illustrate an electronic personnel directory known as COMPANY DIRECTORY™, which is sold by the Ascentis Corporation of Bellevue, Washington. As shown in FIG. 1, COMPANY DIRECTORY™ provides a list 100 of personnel within an organization, and allows a user to search the list using a drop-down menu 102 of possible search criteria. After searching or browsing through the personnel list, and clicking through a personnel entry, COMPANY DIRECTORY™ displays contact information and other data associated with the individual, as shown in FIG. 2. In this example, the contact information and other data include name 200, nick name 202, job title 204, work telephone number 206, e-mail address 208, employee identification 210, department 212, division 214, location 216, and a chart 218 showing the person's role within the organization.

Because the information in the personnel directory is only useful if it is accurate, conventional personnel directories also facilitate the maintenance of the information, to ensure that the data remains up-to-date. In the case of COMPANY DIRECTORY™, the database of personnel information is linked to human resource databases (e.g., payroll systems), so that when a human resource administrator adds employees, terminates employees, or updates employee information in the human resource database, the changes automatically synchronize with the personnel directory.

Personnel directories also permit administrators to revise the personnel entries directly. The personnel directories provide edit functions that enable a directory administrator to edit, delete, and add entries. For example, if a member of the organization changes his or her work location, then the directory administrator can change the member's telephone number and room number. If a member changes her name, for example, because of a marriage, then the directory administrator can change the member's name in the directory. As another example, if a member leaves the organization because of a resignation or retirement, then the directory administrator can simply delete the member's entry from the personnel directory.

Unfortunately, in focusing on up-to-date information, conventional personnel directories ignore the need for historical data. Indeed, by overwriting and deleting outdated information, these personnel directories prevent a user from identifying important relationships between current and old data. This limitation is especially troublesome because, in practice, an organization cannot update all of its records (electronic and paper) at the same time. Thus, paper documents and databases other than the personnel directory may refer to personnel that no longer exist in the personnel directory.

As a hypothetical example, consider a project that was completed several years ago by two employees of ABC Company. The electronic and paper documents associated with the project cite the names of the two employees: Bonnie Smith and Clyde Miller. Now, several years after the project, Amy, another employee from a different department of ABC Company, needs to contact Bonnie and Clyde to ascertain information about the project. Amy may, for example, want to learn about the vendors that Bonnie and Clyde used in completing the project. Since the completion of the project, however, Bonnie's last name has changed from Smith to Jones, because of her marriage. In addition, Clyde no longer works for ABC Company. But, because ABC Company is a large organization and Amy does not personally know Bonnie or Clyde, Amy does not know of these important facts.

To locate Bonnie, Amy consults the personnel directory of the ABC Company. Amy reads the project documentation and enters into the directory search engine the surname for Bonnie that is listed in the documentation, i.e., Smith. Unfortunately, because Bonnie's last name has been changed from Smith to Jones in the personnel directory, the directory returns no matches. Consequently, Amy not only lacks a means for determining how to contact Bonnie Smith, but also lacks an explanation as to why Bonnie Smith no longer appears in the personnel directory.

To locate Clyde, Amy again reads the project documentation and enters into the directory search engine the name that is listed in the documentation, i.e., Clyde Miller. This time, because Clyde left ABC Company and was deleted from the personnel directory, the directory again returns no matches. Consequently, Amy does not have contact information for Clyde, or an explanation as to why Clyde no longer appears in the personnel directory. Furthermore, Amy has no means of identifying alternate employees who may have knowledge of the project, but were not listed in the original project documentation.

Thus, there remains a need for a personnel directory that enables a user to identify relationships between current and historical data.

SUMMARY OF THE INVENTION

The embodiments disclosed herein relate to a system and method for maintaining information in a personnel directory. Unlike the personnel directories of the prior art, the embodiments save historical data and associates that historical data with current data. In this manner, even if a user searches for an individual based on outdated information, the embodiments can retrace and explain changes associated with that individual. Thus, instead of frustrating a user with "no-match" search results, the embodiments may return an affirmative response to the user that provides contact information for the desired person, or, alternatively, provides contact information for a replacement person who can substitute for the desired person.

According to an embodiment, a method for maintaining information in a personnel directory involves receiving a request to edit an existing data entry of the personnel directory, copying the existing data entry to create a previous data entry, editing the existing data entry, and associating the previous data entry with an associated data entry. The previous data entry can be stored in a historical database and the associated data entry can be stored in a current database. In this manner, the method can thither include receiving a search query looking for the previous data entry, searching the current database for the previous data entry, searching the historical database for the previous data entry, identifying the associated data entry as corresponding to the previous data entry, and reporting the previous data entry and the associated data entry.

In another representative embodiment, a personnel directory application receives a request from a user to change information associated with a person listed in the directory (e.g., the person's last name). In response, the personnel directory application changes the person's information as it is stored in a current database, and, at the same time, stores the person's old information in a historical database. The application then associates the old information in the historical database with the new information in the current database. The application can also store an explanation of this association in the historical database along with the person's old information. The explanation can indicate why the person's information changed.

In another representative embodiment, a personnel directory application receives a request from a user to delete a person listed in the directory. In response, the personnel directory application removes the person's data entry from a current database in which it is stored, and, at the same time, stores the deleted person's data entry in a historical database. The application then associates the deleted data entry in the historical database with the data entry of a replacement person in the current database. The personnel directory application can establish this association automatically according to pre-defined rules, or can establish the association at the direction of a user. The application can also store an explanation of this association in the historical database along with the deleted data entry. The explanation can disclose why the deleted data entry no longer appears in the personnel directory and why the user is being referred to the replacement person.

According to the two representative embodiments above, after the data is stored in the current and historical databases, when the personnel directory application receives a search query, the application first searches the current database. If the application finds a data entry in the current database that matches the search criteria, then the application returns that data entry. If the application does not find a matching data entry, then the application searches the historical database using the same search criteria.

After searching the historical database, if the application does not find a match, then the application returns an error message. On the other hand, if the application does find a data entry matching the search criteria in the historical database, then the application returns the matching data entry from the historical database along with the associated data entry from the current database. In the case of a change in a person's information (i.e., the first representative embodiment above), the associated data entry provides the new information (e.g., the new last name) of the desired person. In the case of a deleted data entry (i.e., the second representative embodiment above), the associated data entry provides information corresponding to the replacement person. In addition to the current and historical data, the application can also provide an explanation of the association between the current and historical data.

Accordingly, an object of the embodiments disclosed herein is to enable a user of a personnel directory to use outdated and superseded information to locate a person's information in the directory.

Another object of the embodiments is to link historical personnel data listed in old documentation of an organization to current personnel data of the organization.

These and other objects, aspects, and advantages of the subject matter disclosed herein are described in greater detail in the detailed description of the embodiments and the attached materials. Additional features and advantages of the embodiments will be set forth in the description that follows, will be apparent from the embodiments, or may be learned by practicing the embodiments.

BRIEF DESCRIPTION OF THE DRAWINGS

FIGS. 1 and 2 are screen images of a conventional electronic personnel directory.

DETAILED DESCRIPTION OF TUE INVENTION

Figure 2:
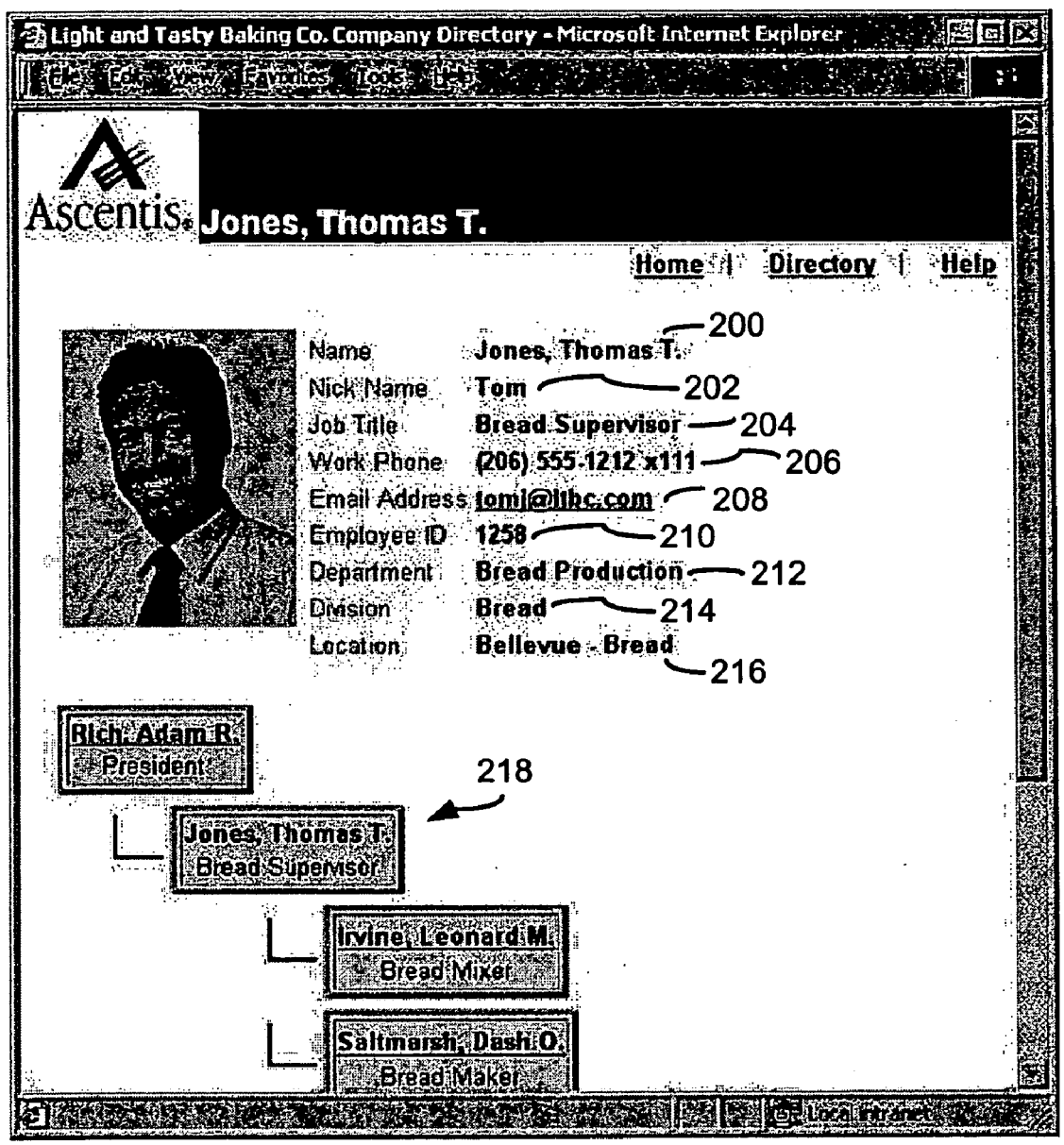
Figure 3:
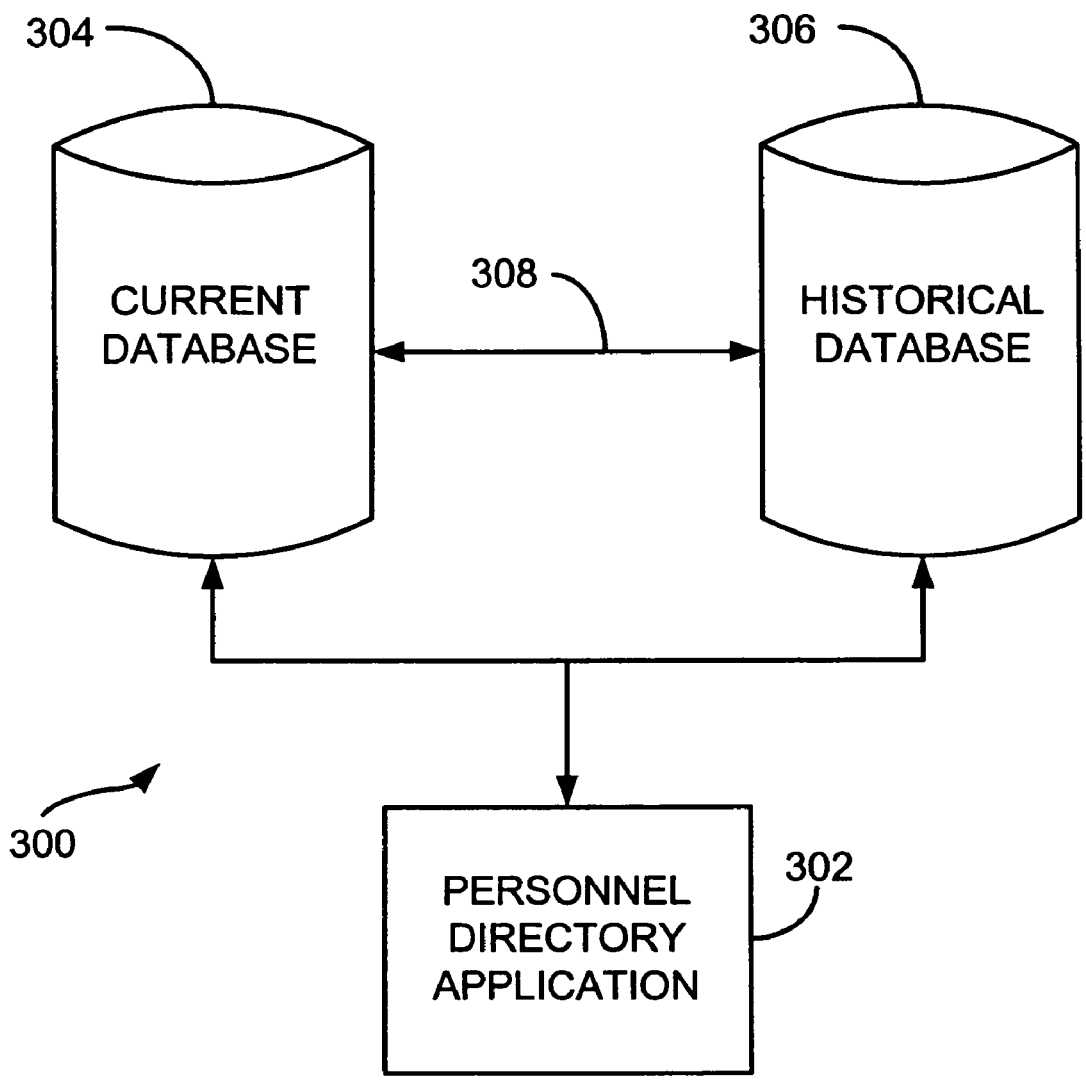
FIG. 3 is a schematic diagram of a system for maintaining a personnel directory, according to an embodiment.

FIG. 3 illustrates a system 300 for maintaining a personnel directory, according to an embodiment. As shown, system 300 includes a personnel directory application 302 in communication with a current database 304 and a historical database 306. Application 302 provides a graphical user interface through which a user can access and manipulate the data stored in databases 304 and 306. Application 302 can be a local desktop application or can be remotely accessible, through an Intranet or Internet browser, for example.

In accessing and manipulating data, application 302 searches and edits databases 304 and 306. For searching, application 302 receives queries from users, searches databases 304 and 306 in accordance with the queries, and returns results to the users listing data that meet the search criteria. Application 302 has the ability to search one or both of databases 304 and 306.

For editing, application 302 enables users to read and/or write to current database 304, to the extent that the users' access levels permit. Writing to current database 304 includes at least one of creating new entries, changing data in existing entries, and deleting entries. In response to changes to current database 304, application 302 updates historical database 306 and establish associations 308 between the data entries of current database 304 and those of historical database 306. If necessary, application 302 prompts a user to provide information concerning an association, as the user is changing a data entry in current database 304. After the data is—changed and associations 308 are in place, application 302 can then read the associations 308 when searching databases 304 and 306 and presenting search results to the user. Examples of the particular methods by which associations 308 are established are described in more detail below.

Although, for clarity, FIG. 3 and its related descriptions herein represent current database 304 and historical database 306 as two individual databases, one of ordinary skill in the art would appreciate that these databases could be a single database. For example, databases 304 and 306 could be single relational database, in which associations 308 are established using well-known file-linking and indexing techniques. Thus, it should be understood that the systems and methods of present disclosure operate according to data associations, rather than any particular database structure.

Figure 4:
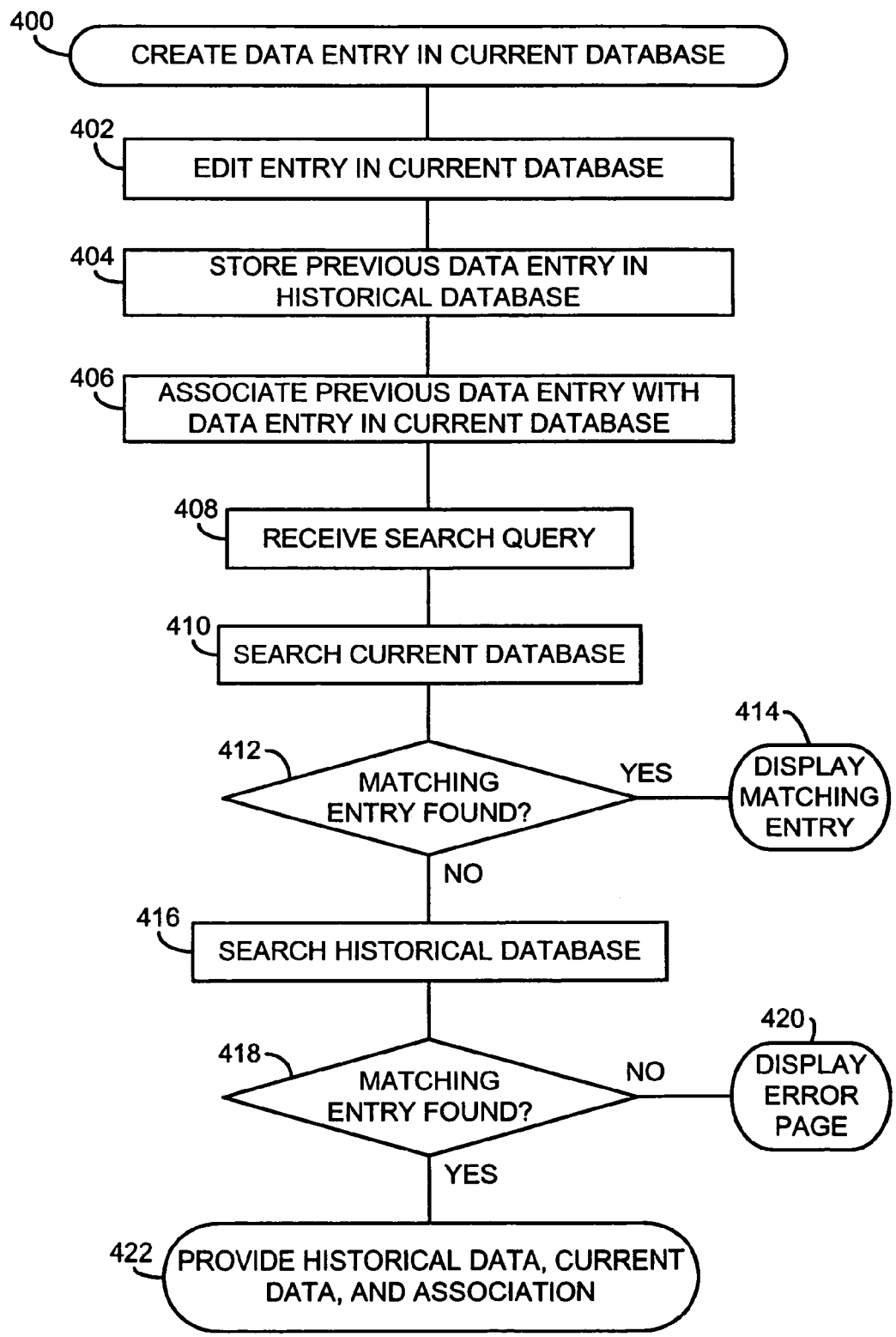
FIG. 4 is an exemplary flow chart outlining a method for maintaining a personnel directory, according to an embodiment.

With reference to system 300 of FIG. 3, FIG. 4 illustrates another embodiment. As shown in FIG. 4, the method begins in step 400 with the creation of a data entry in current database 304 of an organization's personnel directory. This data entry describes a member of the organization, including at least the name of the member, but in most instances, additional information about the member, such as telephone number, e-mail address, office number, and position within the organization. To create the data entry, a user can manually enter the information through the interface provided by personnel directory application 302. Alternatively, application 302 can communicate with another application and/or database, such as a payroll system, to retrieve the information.

Figure 5:
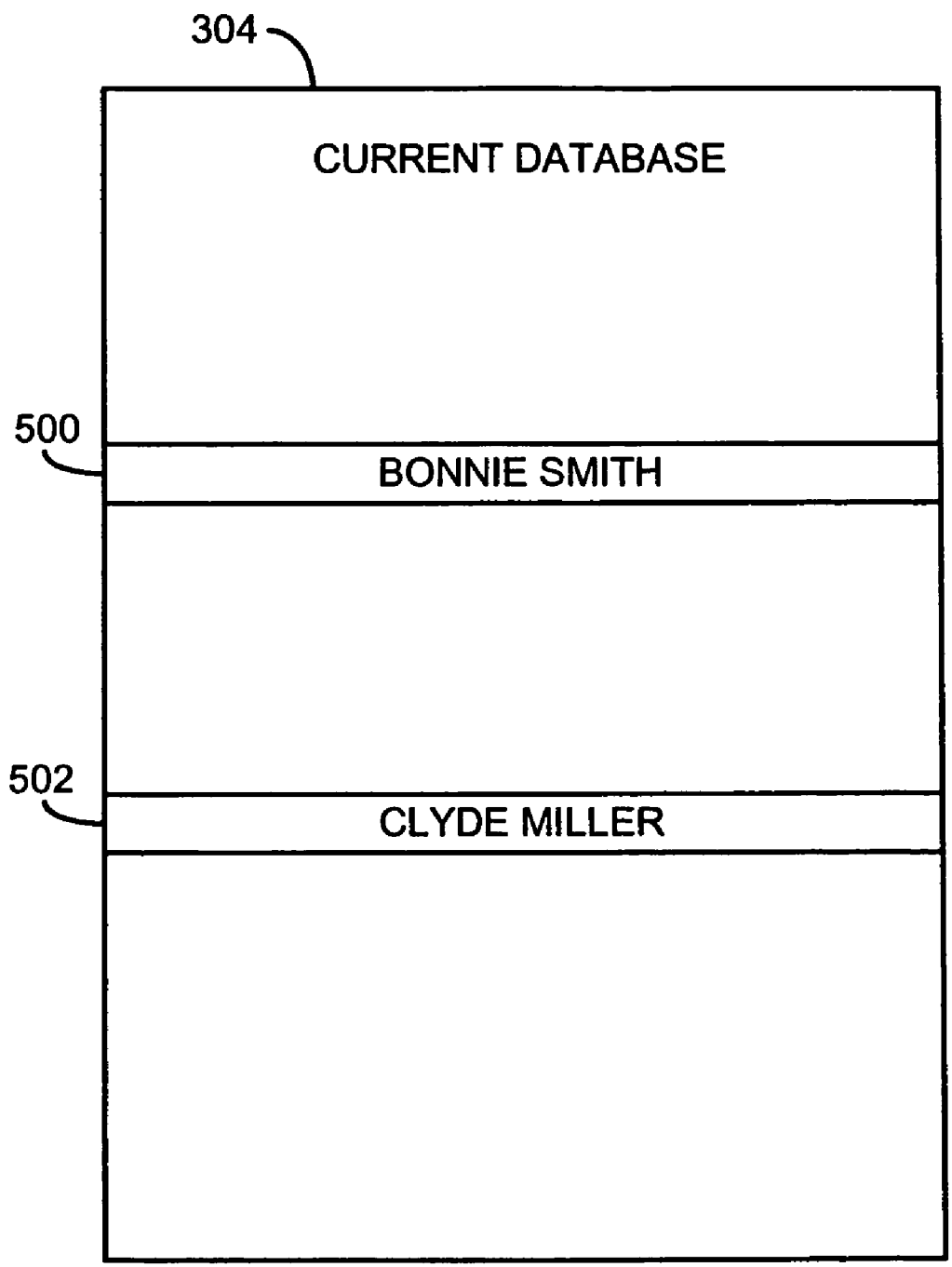
FIG. 5 is a schematic diagram of the current database shown in FIG. 3, having two data entries, according to an embodiment.

As an example, picking up from the exemplary entries discussed in the Background of the Invention, two data entries created in step 400 could be Bonnie Smith and Clyde Miller. Bonnie and Clyde are two employees of the ABC Company, who are listed in ABC's personnel directory. FIG. 5 illustrates how current database 304 appears after step 400, with two data entries 500 and 502 stored for Bonnie Smith and Clyde Miller, respectively.

After the member data entry has been established in current database 304, in step 402, the data entry is edited. This edit can include the revision of the information stored in the data entry, as in the case of a name change, or the deletion of the entire data entry, as in the case of a member's departing the organization. As with the creation of the data entry, edits can occur either through the manual entry of a user or through data synchronization with affiliated systems, such as payroll or human resource systems. At the end of step 402, if the data entry in current database 304 has been revised (as opposed to being deleted), this data entry with the revisions is referred to as the new data entry. If the data entry was deleted, it no longer appears in database 304. In either case of revision or deletion, the data entry as it appeared before the edit is referred to as the previous data entry.

Figure 6:
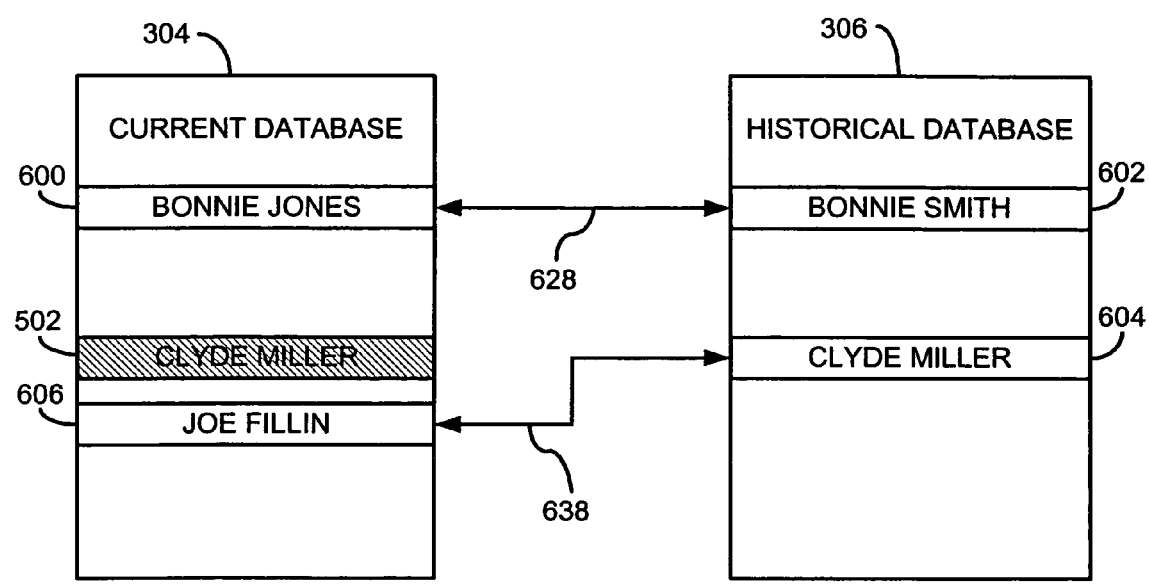
FIG. 6 is a schematic diagram of the databases shown in FIG. 3, indicating associations between old, new, and replacement data entries, according to an embodiment.

In the example shown in FIG. 5, step 402 involves changing the last name stored in data entry 500 from "Smith" to "Jones" (because of a marital name change), and deleting data entry 502 for Clyde Miller (because he left ABC Company). FIG. 6 shows these changes to current database 304. In changing Bonnie's last name, previous data entry 500 is replaced with new data entry 600. The cross-hatching over data entry 502 indicates the deletion of Clyde from current database 304.

In step 404, the previous data entry is stored in historical database 306. Preferably, personnel directory application 302 automatically writes the previous data entry to historical database 306 in response to the edit to current database 304 (step 402). Indeed, one of ordinary skill in the art would appreciate that steps 402 and 404 could occur concurrently or in interchangeable order.

Thus, in this example, as shown in FIG. 6, the previous data entry 500 (of FIG. 5), listing Bonnie Smith, is copied to historical database 306 as data entry 602. Likewise, the previous data entry 502 (of FIG. 5), listing Clyde Miller, is copied to historical database 306 as data entry 604.

In step 406, the method continues by creating association 308 (FIG. 3). Association 308 links the previous data entry that is now stored in historical database 306 with a data entry of current database 304. If the edit in step 402 was a revision, which resulted in a new data entry, then step 406 associates the previous data entry with the new data entry. Thus, for example; in the case of Bonnie, as shown in FIG. 6, new data entry 600 (Bonnie Jones) of current database 304 is linked to previous data entry 602 (Bonnie Smith) of historical database 306, through association 628.

On the other hand, if the edit in step 402 was a deletion, then step 406 associates the previous data entry with a replacement data entry in current database 304. Personnel directory application 302 can automatically determine this replacement data entry according to predefined rules. Alternatively, personnel directory application 302 can prompt the user who deleted the previous data entry for a replacement data entry that should be associated 'with the previous data entry.

Thus, for example, in the case of Clyde, as shown in FIG. 6, previous data entry 604 (Clyde Miller) is linked to replacement data entry 606 (Joe Film). For purposes of this example, Joe Fillin is the new employee of the ABC Company who took over the job responsibilities of Clyde after Clyde departed. Alternatively, Joe Fillin could be Clyde's old supervisor who could speak to Clyde's activities, or at least be able to direct an inquirer to someone with knowledge of Clyde's activities.

Referring again to FIGS. 3 and 4, to determine that Joe Fillin is the replacement data entry 606, personnel directory application 302 requires that the user who is deleting Clyde Miller from the directory enter the name of a replacement or supervisor who will take over for Clyde. Optionally, personnel directory application 302 can be configured to automatically suggest or assign replacement data entry 606 by, for example, matching Clyde's job position and/or department with that of another employee. If application 302 does not find a matching employee, application 302 can be configured to assign Clyde's supervisor to replacement data entry 606.

At the conclusion of step 406, system 300 includes a data entry in current database 304 that is linked by association 308 to a previous data entry in historical database 306. The data entry in current database 304 is either a new data entry or a replacement data entry. With these entries in place, in step 408, personnel directory application 302 receives a search query from a user. This search query can request current information, which is stored in current database 304. Or, in accordance with the object of the present disclosure, this search query can request outdated information that does not appear in current database 304. In the examples discussed above, the outdated information would be Bonnie's maiden name, Smith, or the name of the former employee, Clyde Miller.

Having received the search query, in step 410, personnel directory application 302 searches current database 304. This search covers all up-to-date information. In step 412, personnel directory application 302 determines if any data entries of current database 304 satisfy the search criteria.

If the search finds a match in current database 304, then, in step 414, personnel directory application 302 displays the current data entry. In this case, the user would be looking for an individual who is listed in the directory and would have up-to-date information (e.g., a current name) on that individual. In the example of FIG. 6, a search for Bonnie Smith or Joe Fillin would return the corresponding current data entry in step 414.

If, in step 412, the search does not find a match in current database 304, then, in step 416, personnel directory application 302 executes the same search in historical database 306. In this case, the user would, for example, be looking for an individual whose name has changed, such as Bonnie Smith in FIG. 6, or who has left the organization, such as Clyde Miller in FIG. 6.

In step 418, personnel directory application 302 determines if any data entries of historical database 306 match the search criteria. If the search does not find a match in historical database 306, then, in step 420, personnel directory application 302 returns an error message explaining that no current or historical personnel records match the search criteria. In this case, the user may have incorrectly entered (e.g., misspelled) the search criteria.

If, however, in step 418, personnel directory application 302 identifies a data entry in historical database 306 that satisfies the search criteria, then, in step 422, application 302 displays the matching data entry to the user. This matching data entry is the previous data entry that was stored in historical database 306 in step 404. In displaying the previous data entry to the user, application 302 indicates that the previous data entry contains outdated information that has since been superseded by up-to-date information in current database 304. To aid the user's understanding, application 302 can mark the previous data entry with a visual indication (e.g., a flag) to show that the information is outdated and inaccurate.

Also as a part of step 422, personnel directory application 302 provides the user with access to an explanation of why the information that the user requested is outdated and how that outdated information relates to up-to-date information stored in current database 304. That is, application 302 provides the user with a link from the previous data entry to the current data entry, with an explanation of the association 308 that links them. Thus, in the end, the user finds the individual that the user was looking for, learns that the information that the user provided is outdated, and learns why that information is outdated. In addition, the user obtains current information associated with the outdated information, which facilitates the user's search for a person who can substitute for the individual.

Thus, referring to the example of FIG. 6, if a user searches for Bonnie Smith, then, in step 422, personnel directory application 302 displays data entry 602 from historical database 306, explains to the user that Bonnie's last name has changed from Smith to Jones due to her marriage (i.e., association 628), and provides access to new data entry 600, which lists Bonnie's latest contact information. In this manner, another employee wishing to contact Bonnie Smith, such as Amy described above, can learn of Bonnie's new name and can contact her accordingly.

Similarly, if a user searches for Clyde Miller, then, in step 422, personnel directory application 302 displays previous data entry 604 from historical database 306. Application 302 also explains that Clyde has left the ABC Company (i.e., association 638) and that inquiries about Clyde's work should be directed to his replacement (or supervisor), Joe Film. Finally, application 302 provides the user with access to replacement data entry 606. which lists Joe Fillin's contact information. In this manner, another employee (e.g., Amy) seeking information about an old project of Clyde's can track down an ABC Company employee with knowledge of the project.

Although the embodiments described above illustrate the present disclosure in the context of personnel name changes and departing personnel, one of ordinary skill in the art would appreciate that the various embodiments are useful for tracking any number of changes to a personnel directory. For example, embodiments may be used to track simple changes to contact information, such as telephone number changes. In this way, if a user is searching for an individual based solely on the individual's telephone number, and not the individual's name, and if the individual's telephone number has changed, then various embodiments may trace the telephone number changes, provide the user with previous and current telephone numbers, and ultimately put the user in touch with the desired person. For this reason, and notwithstanding the particular benefits associated with using the various embodiments to track name changes and departing personnel, the system and method described herein should be considered broadly useful for providing current and historical data from a personnel directory, as well as the associations between the current and historical data.

In addition, although the above-illustrated embodiments describe system 300 as returning results in response to a search query, the various embodiments apply equally well to browsing an alphabetical list of names in a personnel directory. In this alternate embodiment, system 300 could provide an alphabetical list of names from one or both of current database 304 and historical database 306. A user could choose whether to view only current names, only previous superseded names, or both. If a user chooses to view both current and superseded names, system 300 could provide a visual indication to distinguish between the current and superseded names, such as marking the superseded names with a red flag.

Figure 7:
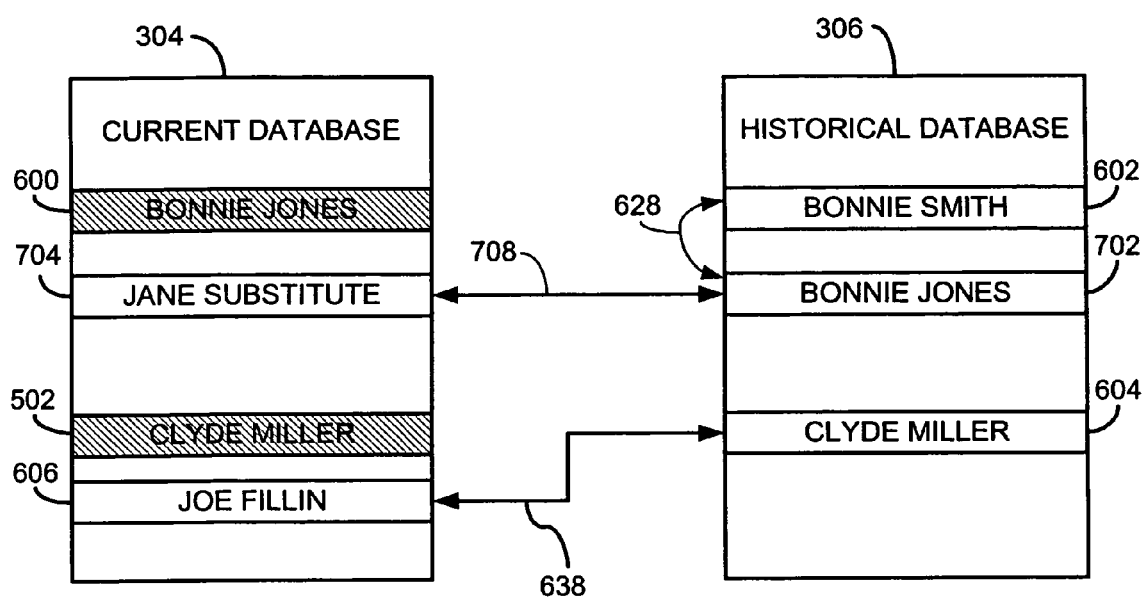
FIG. 7 is a schematic diagram of the databases shown in FIG. 3, indicating associations between old, new, and replacement data entries, after a string of changes to the personnel directory, according to an embodiment.

Another embodiment maintains a string of changes associated with a data entry, by invoking successive iterations of the process illustrated in FIG. 4 and described above. For example, continuing with the Bonnie Smith example from above, consider the situation in which Bonnie leaves ABC Company after Bonnie's last name was changed from Smith to Jones. As shown in FIG. 7, upon Bonnie's departure, personnel directory application 302 deletes data entry 600 (Bonnie Jones) from current database 304, as represented by the cross-hatching. At the same time, application 302 copies data entry 600 into data entry 702 (Bonnie Jones) of historical database, keeping association 628 between data entry 702 and previous data entry 602 (Bonnie Smith) in historical database.

Then, as with the Clyde Miller example, personnel directory application 302 identifies a replacement data entry 704 in current database 304 that should be linked to data entry 600 through an association 708. In this example, replacement data entry 704 corresponds to Jane Substitute. With these data entries and associations established, a search request looking for Bonnie Smith would reveal that Bonnie Smith's name changed to Bonnie Jones, that Bonnie Jones left ABC Company, and that Jane Substitute took over Bonnie Jones' job functions. Although not shown in FIG. 7, optionally, personnel directory application 302 could establish a direct association between previous data entry 602 (Bonnie Smith) and replacement data entry 704 (Jane Substitute).

The foregoing disclosure of the preferred embodiments has been presented for purposes of illustration and description. It is not intended to be exhaustive or to limit the scope of the subject matter disclosed herein to the precise forms disclosed. Many variations and modifications of the embodiments described herein will be obvious to one of ordinary skill in the art in light of the above disclosure. The scope of the subject matter disclosed herein is to be defined only by the claims appended hereto, and by their equivalents.

Further, in describing representative embodiments herein, the specification may have presented the method and/or process of the embodiments as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject matter disclosed herein should not be limited to the performance of their steps in the order written, and one skilled in the art can readily appreciate that the sequences may be varied and still remain within the spirit and scope of the subject matter disclosed herein.

What is claimed is:

1. A method for executing a search query, the method comprising:

storing a plurality of current data entries in a current database by using a personnel directory application through a first database interface, wherein a current data entry of the plurality of current data entries is one of a new entry, a replacement data entry and a data deletion;

storing a plurality of outdated data entries in a historical database by using the personnel directory application through a second database interface, wherein the current database and historical database are separate portions of a single database and the current database and historical database contain data entries that are mutually exclusive;

determining an organizational position of a departing member from an existing data entry, locating a second existing data entry with the organizational position, and making the second existing data entry as the replacement data entry;

determining a type of the current data entry, if the current data entry is one of the new entry and the replacement data entry then establishing logical associations between the current data entries in the current database and the outdated data entries in the historical database by using a rules engine, the rules engine further comprising a set of logic rules;

automatically determine the replacement data entry according the logic rules if the current data entry is the data deletion then prompting for the replacement data entry via a graphical user interface and automatically assigning the replacement data entry from the plurality of outdated data entries to the current data entry; and in the graphical user interface, accepting the search query for a desired outdated data entry, in response to the search query, the graphical user interface presents the desired outdated data entry from the historical database and any associated current data entry from the current database.

* * * * *